(12) United States Patent
Antunes et al.

(10) Patent No.: US 9,133,533 B2
(45) Date of Patent: Sep. 15, 2015

(54) AXLE FROM A SEAMLESS TUBE FOR RAILROAD VEHICLES, AND A PROCESS FOR MANUFACTURING AN AXLE FROM A SEAMLESS STEEL TUBE FOR RAILROAD VEHICLES

(75) Inventors: Ronaldo Faria Antunes, Belo Horizonte (BR); Jose Antonio Filho, Belo Horizonte (BR)

(73) Assignee: V & M DO BRASIL S/A, Belo Horizonte-MG (BR)

( * ) Notice: Subject to any disclaimer, the term of this patent is extended or adjusted under 35 U.S.C. 154(b) by 950 days.

(21) Appl. No.: 12/745,610

(22) PCT Filed: Dec. 1, 2008

(86) PCT No.: PCT/BR2008/000362
§ 371 (c)(1),
(2), (4) Date: Aug. 19, 2010

(87) PCT Pub. No.: WO2009/067773
PCT Pub. Date: Jun. 4, 2009

(65) Prior Publication Data
US 2010/0308612 A1    Dec. 9, 2010

(30) Foreign Application Priority Data
Nov. 30, 2007    (BR) ...................................... 0704944

(51) Int. Cl.
*C21D 8/04*    (2006.01)
*B21J 5/08*    (2006.01)
(Continued)

(52) U.S. Cl.
CPC ... *C21D 9/28* (2013.01); *B21J 5/08* (2013.01); *B21K 1/10* (2013.01); *B60B 35/04* (2013.01);
(Continued)

(58) Field of Classification Search
CPC .......... C21D 1/02; C21D 1/28; C21D 8/0405; C21D 8/10; C21D 9/28; C21D 11/00; B21J 5/08; B21K 1/10; B60B 35/04; B60B 35/08; C22C 38/04; F16C 3/02; Y02W 30/54

USPC .......... 148/320, 546, 547; 420/103, 120, 123, 420/124, 127; 164/4.1, 57.1, 61, 76.1, 499; 295/36.1
See application file for complete search history.

(56) References Cited

U.S. PATENT DOCUMENTS

| 44,434 A | 9/1864 | La Mothe |
|---|---|---|
| 293,201 A | 2/1884 | Stewart |

(Continued)

FOREIGN PATENT DOCUMENTS

| CH | 376955 A | 4/1964 |
|---|---|---|
| CN | 1369335 A | 9/2002 |

(Continued)

OTHER PUBLICATIONS

Chen et al., English translation of CN1920083A, Feb. 2007, p. 1-18.*

(Continued)

*Primary Examiner* — Roy King
*Assistant Examiner* — Caitlin Kiechle
(74) *Attorney, Agent, or Firm* — Alston & Bird LLP

(57) ABSTRACT

The present invention relates to an axle forged from seamless tubes, with a chemical composition suitable to guarantee high fatigue strength, improved yield strength and tensile strength, and having reduced weight for use on railroad vehicles. The present invention further relates to a process of manufacturing the axle forged from seamless steel tube with high fatigue strength, improved yield strength and tensile strength, and having reduced weight for use on railroad vehicles, which is produced from pig iron or scrap, casting, reheating furnace, perforation of billets, elongation of perforated billets, hollow finishing, forging and finish machining, which includes a supporting and centering chamfer at the inner edge of the inspection bore of the end and smooth recess in the entrance of the threaded bores.

27 Claims, 4 Drawing Sheets

(51) Int. Cl.
*B21K 1/10* (2006.01)
*B60B 35/04* (2006.01)
*B60B 35/08* (2006.01)
*C21D 1/02* (2006.01)
*C21D 1/28* (2006.01)
*C21D 8/10* (2006.01)
*C21D 11/00* (2006.01)
*C22C 38/04* (2006.01)
*F16C 3/02* (2006.01)
*C21D 9/28* (2006.01)

(52) U.S. Cl.
CPC . *B60B 35/08* (2013.01); *C21D 1/02* (2013.01); *C21D 1/28* (2013.01); *C21D 8/0405* (2013.01); *C21D 8/10* (2013.01); *C21D 11/00* (2013.01); *C22C 38/04* (2013.01); *F16C 3/02* (2013.01); *Y02W 30/54* (2015.05)

(56) References Cited

U.S. PATENT DOCUMENTS

| | | |
|---|---|---|
| 352,657 A | 11/1886 | Peckham |
| 1,902,910 A | 3/1933 | Oelkers |
| 2,512,186 A | 6/1950 | Urschel |
| 2,747,918 A | 5/1956 | Blackwood |
| 2,829,431 A | 4/1958 | Brauchler |
| 4,895,700 A | 1/1990 | Davison et al. |

FOREIGN PATENT DOCUMENTS

| | | | |
|---|---|---|---|
| CN | 1440842 A | | 9/2003 |
| CN | 1712251 A | | 12/2005 |
| CN | 1920083 A | * | 2/2007 |
| EP | 0044783 A1 | | 1/1982 |
| EP | 0052308 A1 | | 5/1982 |
| EP | 0941783 A1 | | 9/1999 |
| GB | 360521 A | | 11/1931 |
| JP | 56-112912 A | | 9/1981 |
| JP | 09-020961 A | | 1/1997 |
| JP | 2001-206002 A | | 7/2001 |
| JP | 2006-037205 A | | 2/2006 |
| TW | 535347 A | | 6/2003 |
| WO | WO 2007-065235 A1 | | 6/2007 |

OTHER PUBLICATIONS

Lohmeier et al., "Manufacturing of Metallic Pipe", Piping Handbook, 2000, McGraw-Hill, 7th ed., p. 243-259.*

Guthrie et al., "Steel Processing Technology", ASM Handbook, 1990, ASM International, vol. 1, p. 107-114.*

El-Kaddah et al., "Electromagnetic Stirring of Steel: Effect of Stirrer Design on Mixing in Horizontal Electromagnetic Stirring of Steel Slabs", Dec. 1999, Second International Conference on CFD in the Minerals and Process Industries, CSIRO, Melbourne, Australia, p. 339-344.*

Kyriakides et al., "Pipe and Tube Manufacturing Processes", Mechanics of Offshore Pipelines, 2007, Elsevier, vol. 1, p. 59-78.*

Douglas, Richard, "Hot Upset Forging", ASM Handbook, 2005, ASM Internation, vol. 14A, p. 120-130.*

The International Burearu of WIPO, International Preliminary Report on Patentability for International Application No. PCT/BR2008/000362, Jun. 2, 2010, 7 pages, Switzerland.

Binghau, Li, et al., "Fatigue Design of Wheel Axles of Locomotives and Rolling Stocks with High Speed", *Diesel Locomotives*, Jan. 2000, 9 pages, Dalian Locomotive and Rolling Stock Works, China.

* cited by examiner

AXLE FROM A SEAMLESS TUBE FOR RAILROAD VEHICLES, AND A PROCESS FOR MANUFACTURING AN AXLE FROM A SEAMLESS STEEL TUBE FOR RAILROAD VEHICLES

CROSS REFERENCE TO RELATED APPLICATIONS

This application is a national stage application, filed under 35 U.S.C. §371, of International Application No. PCT/BR2008/000362, filed Dec. 1, 2008, which claims priority to Brazilian Application No. PI0704944-7 filed Nov. 30, 2007, both of which are hereby incorporated by reference in their entirety.

BACKGROUND OF THE INVENTION

1. Field of Invention

The present invention relates to axles for railroad vehicles, which are forged from seamless tubes, to reduce the weight, the chemical composition and manufacturing process of which are specially designed to guarantee high mechanical strength and fatigue strength. The invention also relates to a process of manufacturing this tubular axle.

2. Description of Related Art

At present, the consumption of fuel and the emission of pollutants in railroad transportation are great concerns of the railroad sector, due to their implications in the operation cost and in the environment. The railroad-vehicle tare is one of the main factors that influence these parameters. In this aspect, one should note that the axles of the railroad vehicles can bear 10% of the tare and are predominantly massive.

Besides, as a result of the increase in the use of railroads as a transportation system, the present trend is that the load and the weight transported by the railroads increase significantly, which consequently causes an increase in the strain applied onto the railroad axles, thus requiring greater strength of the material and adaptation in the design of these axles, so that they will have good durability.

The search for technologies to reduce the weight through the concept of tubular axle in the railroad sector already exists since the 19$^{th}$ century, as shown in U.S. Pat. No. 44,434, entitles "Improvement in Car Axles", of B. J. La Mothe, of 1864. This patent proposes that the axle should be composed of various tubes of different diameters engaged and fitted by mechanical interference.

Stewart, George W., author of U.S. Pat. No. 293,201, entitled "Car Axle", in 1884, claimed the invention of a tubular axle with uniform section, the journals of which for the friction bearings were massive bushings partly introduced with interference into the axle as far as the wheel region.

Pekham, E., author of U.S. Pat. No. 352,657, entitled "car Axle", in 1886, refers to a similar proposal, pointing out, as an improvement, the application of a tubular internal reinforcement at the axle spindle, which may be shaped later to form the seat of the friction bearing, which was the type of bearing used at that time.

Ernest Kreissig, author of British patent GB 360,521, granted in 1931, entitled "Improvements in ( . . . ) Hollow Shafts", does not refer specifically to the axle or its manufacture, but to a bar (or tube) previously subjected and kept under tensile stress inside hollow shafts to subject them to compression stresses, proportionally compensating for the tensile stresses resulting from the axle bending under normal operation conditions.

Oelkers, Alfred H., author of U.S. Pat. No. 1,902,910, entitled "Anti-friction Wheel and Axle Construction", 1933, proposed variations of axles and wheel by combining concentric tubes, massive spindles and bearings, allowing, in one of the combinations, the axle to be static and that only the wheel turned, unlike the classic situation of axle and wheels turning together.

Urshel, B. H., author of U.S. Pat. No. 2,512,186, in 1950, entitled "Vehicle Axle", refers to a proposal of a tubing composition and cites other variations, like an axle with an annular chamber formed by the axle and an internal tube, filled with liquid, the function of which would be the heat transfer from the axle to the environment.

Blackwood, W., author of U.S. Pat. No. 2,747,918, entitled "Railroad Vehicle Axles", granted in 1956, proposed the combination of a conventional massive axle within a tubular axle, the space of which would be filled with units of a resilient material, such a rubber. In this case, the objective was to attenuate shocks and distribute loads uniformly, thus preventing fatigue problems.

Adrianne, J. L. C, author of Swiss patent CH 376,955, entitled "Procédé pour la fabrication d'essieux de matériel roulant>>, granted in 1958, proposed more variants of tubular axles, pointing out the process of hot-rolling the ends by way of three stepped cylinders, with the desired profile of the ends.

As to the material used for manufacturing railroad axles, some manufacturers, as for instance the Brazilian and North-American ones, try to follow the standards of the technical rules of the American Association of Railroads (AAR). According to the rules of the AAR, the compositions of railroad axles should meet the following criteria, shown in Table 1 below.

TABLE 1

Technical rules of the AAR ("AAR Manual of Standards and Recommended Practices - Wheels and Axles - Axles, Carbon Steel, Heat-Treated - Specification M-101 - Revision 2004") for the chemical composition of railroad axles

| | Reference of heat treatment of the axle | | | | |
|---|---|---|---|---|---|
| | AAR - Grade F (Double Normalized and Tempered) | | AAR - Grade G (Quenched and Tempered) and AAR - Grade H (Normalized, Quenched and Tempered) | | |
| Element | Min | Max | Min | Max | Unit |
| C | 0.45 | 0.59 | — | — | % wt |
| Mn | 0.60 | 0.90 | 0.60 | 0.90 | % wt |
| P | — | 0.045 | — | 0.45 | % wt |
| S | — | 0.50 | — | 0.50 | % wt |
| Si | 0.15 | — | 0.15 | — | % wt |

New developments relating to the railroad-axle technique followed since then, and the tubular concept is used at present on high-speed passenger cars, locomotives and freight cars.

At present, the prior art relating to railroad axles comprises, on the one hand, the use of massive axles using metal alloys that meet the AAR technical rules, these axles being produced from bars that are transformed into beam and the mechanical properties of which also meet the AAR technical rules.

On the other hand, the prior art relating to railroad axles also comprise the use of tubular axles. These axles are produced from forged bars that are perforated by machining. These tubular axles have a weight 20% lower than those of massive axles, but the manufacturing process entails considerable raw material waste and has a high operational cost, in exchange for a little weight reduction.

There are also tubular railroad axles from the prior art, comprised of seamless tubes, which are produced by forging. These axles have a weight of about 40% lower than the massive ones.

Patent document EP044783 A1 discloses a process of manufacturing a forged axle for railroads that may be one manufactured from a tube or still a massive piece. In this process, the workpiece is heated and then simultaneously undergoes a step of upsetting the intermediate part together with a step of shaping the spindles thereof with closed matrixes. This document does not disclose thermal treatments that seek to improve the fatigue, hardness and strength properties of the tubular axle, nor does it disclose a specific composition of this axle to achieve these same properties.

Patent document EP 0052308 discloses a highly loaded forged steel workpiece, which, after being hot-forged, is subjected to quenching. This workpiece has contents from 0.05 to 0.25% wt carbon and from 1.0 to 2.0% wt manganese. This document does not foresee the application of this process or of this workpiece to tubular axles for railroads, nor does it identify or disclose various processing steps necessary to change this workpiece into a seamless tube. Also, one does not foresee, in this document, ranges of values of physical properties which this workpiece should exhibit, such as yield strength, tensile strength, elongation and fatigue strength.

Patent document U.S. Pat. No. 4,895,700 foresees an axle for railroad vehicles that is massive and exhibits contents from 0.40 to 0.48% wt carbon, from 1.35 to 1.61% wt manganese, from 0.16 to 0.30% wt silicon, from 0 to 0.23% wt chromium. This composition is adapted to form axles ranging from 5.33 cm to 6.6 cm diameter, and bears about 14.7 to 19.6 tons. Therefore, the application of the axle and its much reduced dimensions are different from those of the present invention, and besides it does not have a tubular geometry.

Massive axles often exhibit greater strength than that necessary to bear the load to which they are subjected. This means that these axles can have a weight higher than necessary, which causes a consumption of material in producing the axle that could be prevented.

On the other hand, the tubular concept, mainly in the case of seamless tubes having smaller thicknesses than the perforated bar axles, implies, as a result, that some portions of the axle will remain subject to greater stresses and others will remain subject to greater strains than in the case of other axles (massive or perforated bars) under the same loading conditions.

BRIEF SUMMARY OF THE INVENTION

A first objective of the invention is to provide a tubular axle with lower weight, which has, at the same time, properties of fatigue strength and improved yield strength and tensile strength, which enable it to bear high stresses applied onto it.

Another objective of the invention is to provide a tubular axle and a process for making it, which provide saving of the material used to make this axle, as well as has a low production cost.

A further objective of the invention consists in providing a process for producing tubular axles that has improved quality control of the axles produced, by virtue of the modern computer aids, production methodologies and inspection techniques.

It is a further objective of the invention to provide a process for producing tubular axles that enables the statistic control over process and determined properties of the axles, in order to guarantee that the axles be suitable for different purposes and different applications.

The objectives of the invention are achieved by means of an axle forged from a seamless steel tube for railroad vehicles, which is constituted by a material from a metallic steel alloy comprising from 0.22 to 0.42% wt of carbon; from 1.10 to 1.70% wt of manganese, the finished axle having the properties of: a minimum yield strength of 520 MPa, a minimum tensile strength of 750 MPa and minimum elongation of 16%.

The metal alloy material may comprise at least one of the following element contents: up to 0.020% wt of sulfur, up to 0.020% wt of phosphorus, from 0.10 to 0.45% wt of aluminum, from 0.10 to 0.35% wt of silicon, from 0.10 to 0.30% wt of molybdenum, from 0.010 to 0.050% wt of niobium, and from 0.05 to 0.27% wt of vanadium.

Alternatively, the metal alloy material comprises from 0.22 to 0.32% wt of carbon and from 1.01 to 1.40% wt of manganese, or still from 0.32 to 0.42% wt of carbon and from 1.40 to 1.70% wt of manganese.

The metal alloy material alternatively comprises up to 0.010% wt of phosphorus and up to 0.010% wt of sulfur.

Axle samples, tested by being rotated while subjected to a bending load, must exhibit a fatigue limit of 120 MPa and preferably 170 MPa.

The objectives of the invention are also achieved by means of a process for manufacturing an forged axle from seamless steel tube for railroad vehicles, which comprises the following steps:
melting the metal alloy material, generating the steel metal alloy;
casting the molten material, forming ingoted products;
reheating the ingoted products in a reheating furnace for perforation;
perforating the ingoted products;
elongating the perforated products, forming hollow blooms;
finishing the hollows, changing them into seamless tubes;
forging the seamless tubes, changing them into axles forged from seamless tubes for railroad vehicles.

The process may further comprise, after the melting step, a secondary refining step, in which one makes the adjustments in the chemical composition of the metal alloy, and metallurgical treatment with calcium-silicon, as well as, after the secondary refining step, a vacuum-degassing step.

The casting step may be carried out under electromagnetic stirring. After the casting step, the ingoted product may be subjected to an auxiliary reheating step at a temperature of 880° C. to 1300° C. for a time between 1 and 48 hours. After the auxiliary reheating step, the process may further include a rolling step.

The reheating step for perforation is preferably carried out in a reheating furnace at a temperature between 1000° C. and 1300° C.

Alternatively, the process has a hollow reheating step between 820° C. and 980° C. prior to the hollow finishing step and, after finishing the hollows, the axle tube pieces, still in the form of seamless tubes, are subjected to a cooling bed.

Preferably, prior to the forging step, the seamless tubes are normalized, wherein the seamless tubes are kept at temperatures between 880° C. and 950° C. for at least 10 minutes of soaking time, and then the seamless tubes are subjected to air cooling.

Alternatively, prior to the forging step, the seamless tubes are quenched, wherein fast cooling of the axle-tube pieces is carried out by a medium selected from water and oil. The seamless tubes may further be tempered in a reheating furnace, where they are kept at temperatures between 400° C. and 700° C. for at least 10 minutes of soaking time, and then the axle tube pieces are subjected to air cooling.

Alternatively, prior to the forging step, the seamless tubes are hot-straightened and follow to a cooling bed. The process may also comprise, prior to the forging step, a step of inspecting the tubes by non-destructive tests of dimensions and surface discontinuities and/or a finishing step, which comprises machining over the whole inner surface of the seamless tubes. After machining, one may carry out the grinding of the inner surface of the seamless tubes, or still the burnishing of the inner surface of the seamless tubes.

Preferably, prior to the forging step, one carries out the upsetting operation, in which the seamless tubes are heated between 800° C. and 1300° C. in the region where the thickness will be increased, and then a longitudinal compressive force is applied in the axial direction through the advance of at least one upsetting tool, whereby an upsetted seamless tube is obtained.

The forging step is hot-made and may be carried out in temperatures in the range of 800° C. to 1300° C. by means of at least two varying-course matrices that oscillate radially, an auxiliary upsetting tool and a handler for translation and rotation of the seamless tube, which are commanded by computerized numerical control or carried out by cold and warm forging in a temperature range from room temperature to 800° C., or by hot forging in temperatures between 800° C. and 1300° C. by at least one matrix that compresses axially and radially the tube ends, transforming it into a forged axle. If the forging is a hot one, the process further comprises a cooling step after the forging, in which the cooling is carried out in a medium selected from the following media: air, forced air, water and oil.

The process may further comprise a step of normalizing at least a part of the axle, by using a furnace for reheating at temperatures between 880° C. and 950° C. for at least 10 minutes of soaking time and cooling in air and/or a step of quenching at least a part of the axle tube, using for, austenitizing, a furnace for reheating up to temperatures between 880° C. and 950° C. for at least 10 minutes of soaking time and, for quenching, an fast cooling with water, and/or a step of tempering at least a part of the axle tube, using a furnace for reheating up to temperatures between 400° C. and 700° C. for at lest 10 minutes of soaking time and air cooling.

Alternatively, the finishing step comprises at least one of the following steps: shot peening the inner surface of the tube, straightening the tube, inner machining of the inspection bores at the two ends of the tube, machining the chamfering at the edge of the inner diameter of the inspections bores of the tube, and machining at least two threaded bores and a smooth recess at each end. After the finishing step, a thermal treatment step of quenching and tempering may be applied to at least a part of the forged axle, and a final step of inspecting surface defects of the axle tube piece is carried out.

Finally, the objectives of the invention are also achieved by means of an axle with the composition and properties described herein and that is produced by a process of the type described herein.

BRIEF DESCRIPTION OF THE FIGURES

For a better understanding, the characteristics and advantages of the present invention will be presented and described in conjunction with their respective figures, which illustrate some preferred configurations of the invention.

DETAILED DESCRIPTION OF VARIOUS EMBODIMENTS OF THE INVENTION

Figure 1:
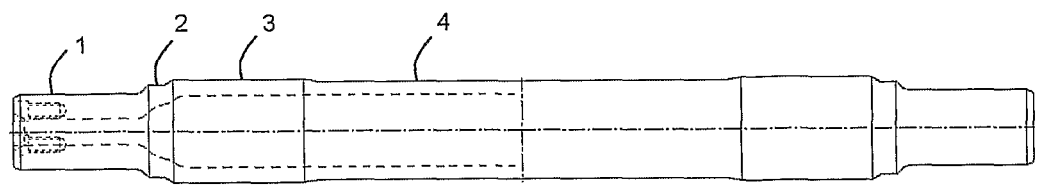
FIG. 1 shows a front view of a preferred embodiment of the tubular railroad axle according to the present invention.
Figure 2:
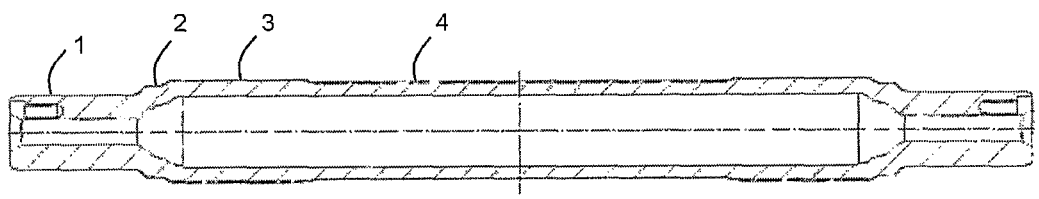
FIG. 2 shows a cross-section front view of a preferred embodiment of the tubular railroad axle according to the present invention.
Figure 11:
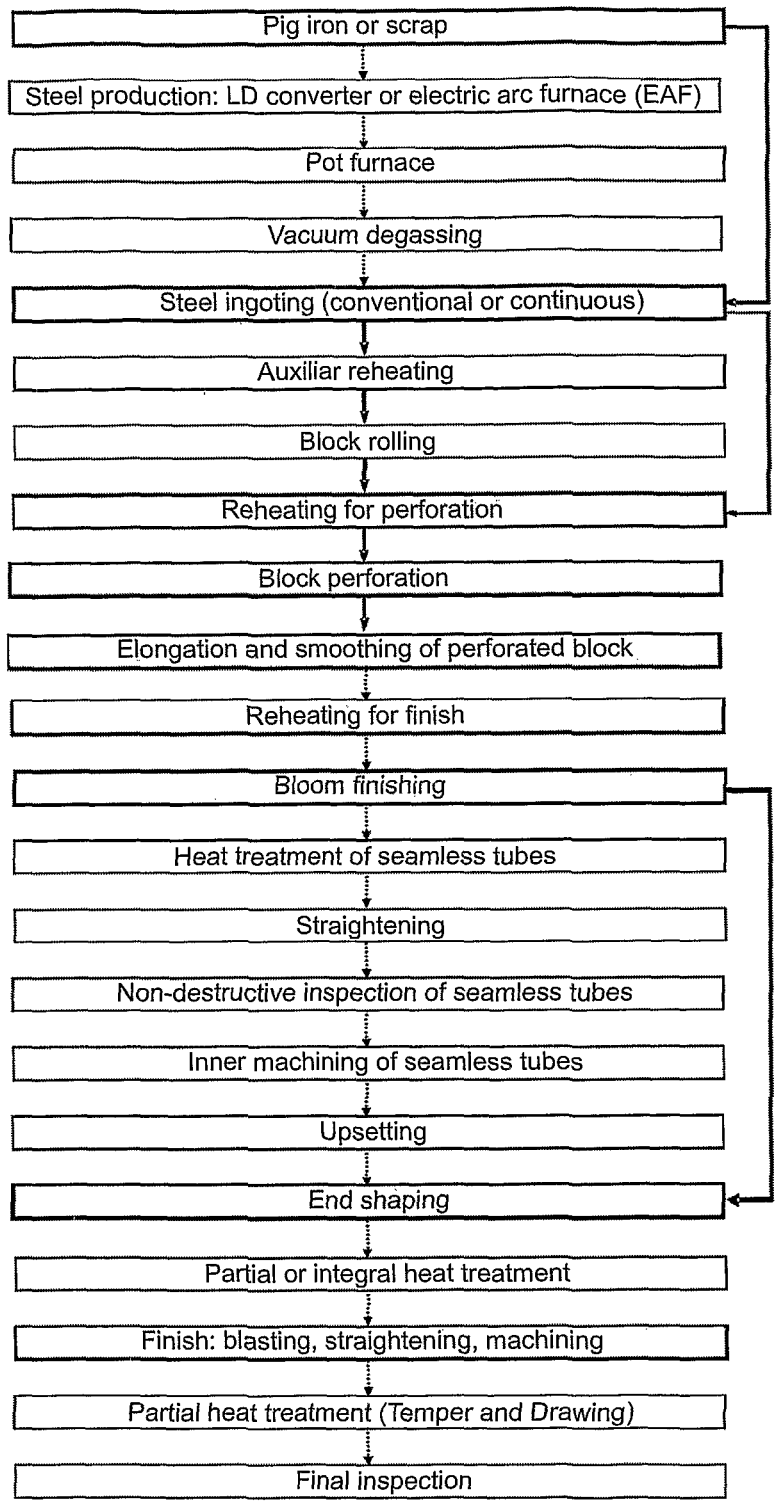
FIG. 11 shows a flowchart of the manufacturing process of a tubular railroad axle according to the present invention, the preferred embodiment being highlighted in gray.

FIGS. 1 and 2 illustrate a preferred embodiment of the axle forged from a seamless tube for railroad vehicles according to the present invention, and the flowchart of FIG. 11 illustrates a preferred process of manufacturing this axle. The main sections of the tubular axle are the journal or the bearing seat 1, the dust guard 2, the wheel seat 3 and body 4. FIG. 2 shows that the wall thickness of the respective sections may vary.

Figure 3:
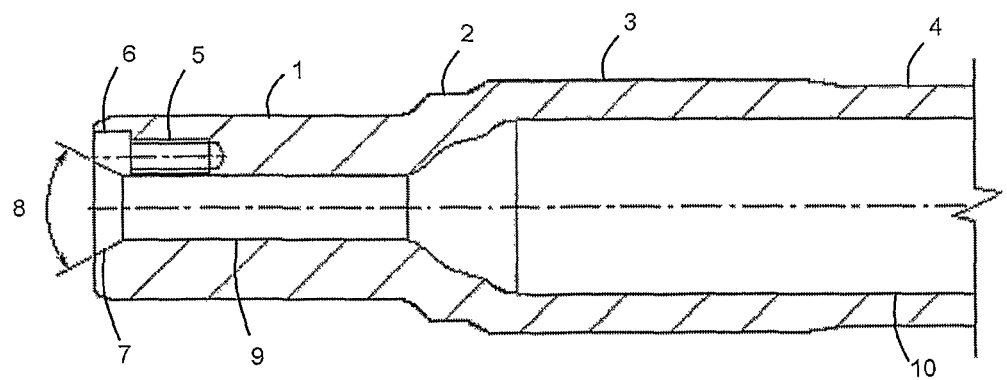
FIG. 3 shows a cross-section front view of a detail of the end of the tubular railroad axle according to the present invention.

The end of the tubular railroad axle according to the present invention is shown in highlight in FIG. 3. The axle preferably has three threaded bores 5 and a recess 6 at each end, to fix the bearing covers and a chamfer 7 for support between conical tips with angle 8. The inner surface 9 of the end can be used for coupling ultrasound inspection probes for inspection of the journal 1, the dust guard 2 and, in some cases, of a part of the wheel seat 3. The inner surface 10 can be used for coupling ultrasound inspection probes for inspection of the wheel seat 3 and the body 4.

Figure 4:
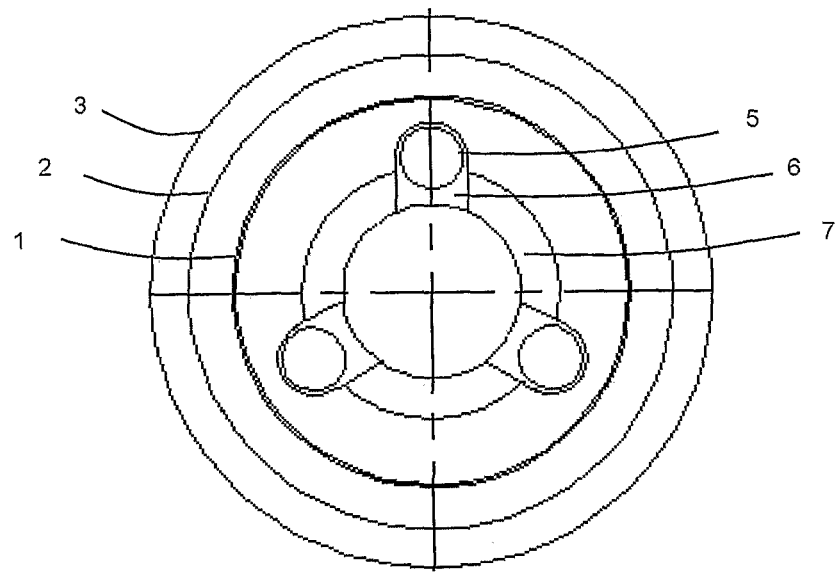
FIG. 4 is a left side view of the tubular railroad axle.

In FIG. 4, in which a left side view of the tubular railroad axle is represented, are shown three threaded bores 5, the recess 6, and chamfer 7 for support between conical tips.

The axles forged from seamless tubes according to the present invention are shaped as shown in the figures with a varying thickness, that is to say, with a varying distribution of material along its length, so as to provide greater robustness and fatigue strength only at the point where the axle undergoes greater loading. This shape is already known from the prior art.

However, the axle forged from a seamless tube according to the present invention has a performance superior to that of axles of the same shape known from the prior art, since it comprises a material having superior mechanical properties, which are still potentiated by means of the process of making these axles according to the present invention. The composition of the axle forged from a seamless tube according to the present invention, as well as its manufacturing process, enable one to adequately specify the properties of the material to compensate for the variations of loads which the axle is subjected to.

The chemical, mechanical and metallurgical properties considered in this development for adaptation of the material to the application are: chemical composition, mechanical strength (yield strength, tensile strength, fatigue limit, elongation, hardness) and microstructure (phases and constituents, grain size). Most of these properties are interrelated and associated to the specified characteristics of the processes of manufacturing hot-rolled seamless steel tubes, hot-forging and heat treatments.

On the basis of the foregoing, one has developed a chemical composition for the metallic steel alloy that composes the seamless tube axle, which comprises from 0.22 to 0.42% wt of carbon and 1.10 to 1.70% wt of manganese, the metallic alloy material having a minimum yield strength of 520 MPa, a minimum tensile strength of 750 MPa and minimum elongation of 16%.

The composition may further comprise low contents of molybdenum, aluminum, niobium, vanadium and other metals. For example, the metal alloy may comprise from 0.10 to 0.45% wt of aluminum and/or from 0.10 to 0.35% wt of silicon and/or from 0.10 to 0.30% wt of molybdenum and/or from 0.010 to 0.050% wt of niobium, and/or from 0.05 to 0.27% wt of vanadium.

In an alternative embodiment of the invention, the metallic alloy comprises up to 0.020% wt of sulfur and/or up to 0.020% wt of phosphorus, or still preferably up to 0.010% wt of phosphorus and/or up to 0.010% wt of sulfur.

According to another alternative embodiment of the invention, the metal alloy of the tubular axle comprises from 0.22 to 0.32% wt of carbon and from 1.10 to 1.40% wt of manganese, and it may further comprise up to 0.020% wt of phosphorus, and/or up to 0.020% wt of sulfur, and/or from 0.10 to 0.35% wt of silicon, and/or from 0.010 to 0.30% wt of molybdenum, and/or from 0.10 to 0.45% wt of aluminum, and/or from 0.010 to 0.050% wt of niobium, and for from 0.05 to 0.27% wt of vanadium.

According to another embodiment of the invention, the metal alloy material of the tubular axle comprises from 0.32 to 0.42% wt of carbon, and from 1.40 to 1.70% wt of manganese, and it may further comprise up to 0.020% wt of phosphorus, and/or up to 0.020% wt of sulfur, and/or from 0.10 to 0.35% wt of silicon, and/or from 0.10 to 0.30% wt of molybdenum, and/or from 0.10 to 0.45% wt of aluminum, and/or from 0.010 to 0.050 wt of niobium, and/or from 0.05 to 0.27% wt of vanadium.

The raw material of the metallic steel alloy is preferably pig iron, scrap, or still a mixture of any proportion of pig iron and scrap.

Table 2 below contains the ranges of chemical elements that are contained in the chemical composition of the product according to one embodiment of the invention.

TABLE 2 ranges of the chemical composition (% by weight) according to one embodiment of the invention

| % wt | C | Mn | P | S | Si | Mo | Al | Nb | V |
|---|---|---|---|---|---|---|---|---|---|
| Min | 0.22 | 1.10 | — | — | 0.10 | 0.10 | 0.10 | 0.010 | 0.05 |
| Max | 0.42 | 1.70 | 0.010 | 0.010 | 0.35 | 0.30 | 0.45 | 0.050 | 0.27 |

In designing this chemical composition, each element was carefully adjusted in accordance with the criteria described hereinafter.

Manganese, which is the substitute element in solid solution, provides increase in strength as it is added.

Interstitial elements, like carbon and nitrogen, should be reduced for the purpose of maximizing the contents of manganese in solid solution, thus improving the mechanical strength. In this sense, elements like aluminum, the main function of which is deoxidation, but also contributes to the strength, niobium and molybdenum, contribute in removing the interstitial elements from the matrix, minimizing the formation of manganese carbides. The carbon content, however, should not be very low, in order to guarantee the strength necessary to the application thereof together with the other elements, and not to impair the hardenability, since manganese also lowers the martensite-forming temperature, which, on the other hand, is partly compensated by aluminum.

Elements such as sulfur and phosphorus should be the lowest possible, because they are associated with microinclusions and to microsegregations, factors that reduce the fatigue strength of the material. Other elements, like silicon and others already mentioned (C, Mo, Nb), contribute to increase the mechanical strength by means of various hardening mechanisms like solid solution, carbide precipitation and grain refinement.

Table 3 below comparatively illustrates the specifications of mechanical properties and grain size according to the AAR standards ("AAR Manual of Standards and Recommended Practices—Wheels and Axles—Axles, Carbon Steel, Heat-Treated—Specification M-101—Revision 2004") for railroad axles and their respective heat treatments, as well the results of mechanical properties and grain size of one embodiment of the invention.

TABLE 3

Specifications of mechanical properties and grain size according to the AAR standards ("AAR Manual of Standards and Recommended Practices - Wheels and Axles - Axles, Carbon Steel, Heat-Treated - Specification M-101 - Revision 2004") for railroad axles and their respective heat treatments, as well the results of mechnical properties and grain size of one embodiment of the invention.

| Material (heat treatment) | Yield strength (MPa) | Tensile strength (MPa) | Elongation (%) | Grain size according to ASTM E 112 |
|---|---|---|---|---|
| AAR - Grade F (Double normalized and tempered) | 345 | 610 | 22 | >5 |
| AAR - Grade G (Quenched and tempered) | 380 | 620 | 20 | >5 |
| AAR - Grade H (Normalized, quenched and tempered) | 520 | 790 | 16 | >5 |
| Results of one embodiment of the invention | 610 | 840 | 17 | 7-9 |

The fatigue limit of a material can be evaluated by rotating bending lab tests at room temperature, on which many samples are tested to failure to establish the stress (S)×life (N−number of cycles to failure) curve for the material. Samples are tested by being rotated while subjected to a bending load. This results in an alternating bending stress in a similar way as present on the real scale axle. If the bending load is constant, as a result, the ratio of minimum to maximum stress (R) is always −1. It is assumed that there is a minimum stress on the stress-life curve (S–N) of the material, bellow of which it is not observed any failure as the number of cycles increases. This stress is defined as fatigue limit of the material. Axle samples, tested by being rotated while subjected to a bending load, according to one embodiment of the invention show a fatigue limit of 120 MPa. In another embodiment of the invention a fatigue limit of 170 MPa could be obtained.

In view of the different physical properties which each of these chemical elements imparts to the steel alloy material, one can adjust the chemical composition of this material as a function of the properties which the tubular axle should have, depending on the specific application in which it will be used. Since several steps of the process of the present invention are numerically and electronically controlled, with the aid of a computer, it is possible to configure this process to obtain axles with the desired chemical composition.

With the aid of the flowchart presented in FIG. 11, one presents hereinafter the main steps of the preferred and alternative embodiments of the process of manufacturing the axle, which are the objective of the present invention together with the axle itself obtained this way.

Initially, the raw material of the metal alloy is molten, generating a metallic steel alloy molten material. Melting of the alloy used in this product can be carried out by using LD converter or an electric arc furnace (EAF), and as raw material, pig iron, scrap or the mixture of pig iron and scrap in any proportion. The LD converter should be equipped with submerged blowing, which enables the use of argon and/or nitrogen throughout the processing. By preference, this step is totally controlled by computer through static and dynamic models derived from their own development. The automatic measurement of the temperature during blowing and the calculation of the alloy addition make part of this system. This routine guarantees the necessary low phosphorus and sulfur contents to the product.

Then the steel may be subjected to the secondary refinement, and adjustments are made in the chemical composition, as well as the metallurgical treatment with calcium-silicon. This secondary refinement is preferably carried out in a ladle furnace. The addition of alloys, the treatment with calcium-silicon, the argon bubbling and the collection of samples should be made in this equipment, by preference, in a totally automated manner. Through this process, one guarantees the production of steel in a narrow composition range aiming to meet the product quality. As a result of inert-gas bubbling and the use of synthetic slag, the sulfur content may achieve quite low levels. The secondary refinement in a ladle furnace also improves the micro cleanliness, that is to say, a smaller number and size of inclusions, allows a better distribution of the alloy elements and a better adjustment of the liquid steel temperature.

After the secondary refinement in a ladle furnace, the material can be degasified under vacuum for the purpose of minimizing the contents of gases like oxygen, nitrogen and hydrogen. In this equipment, it is possible to reach a pressure of 0.2 kPa (2 mbar), besides allowing argon injection even under deep vacuum. Thereby; one can easily achieve quite low hydrogen and oxygen levels.

The process further comprises a step of casting the molten material, producing an ingoted product. Casting may be either continuous or conventional.

If the continuous casting is carried out, the steel is led to a continuous casting machine, which will be preferably effected under electromagnetic stirring. In a preferred embodiment of the invention, this machine is equipped with double electromagnetic stirring coils, which provide better quality of the ingoted material with respect to the segregation of elements and central porosity, which also contributes to the fatigue strength of the material.

In case casting is carried out in a conventional way, it may be necessary to transform the ingots into round-profile ingoted bars, before subjecting the material to perforation, the next production step.

The products ingoted in the form of bars, produced after the continuous or conventional casting are preferably subjected to an auxiliary reheating step at a temperature between 880° C. and 1300° C. for a time between 1 hour and 48 hours.

The bars ingoted by continuous or conventional casting are also cut into billets with adequate length before being employed in the billet perforating plants.

After this auxiliary reheating, the bars or billets that have not got a rounded profile yet may pass through a rolling step, to form rounded-profile bars.

Prior to the step of perforating the billets, the ingoted product and, as the case may be, also rolled, is subjected to a reheating step for perforation, in which the product is preferably heated to a temperature between 1000 and 1300° C. in an appropriate reheating furnace.

Then, the perforation may be carried out by using a hot billet piercing mill with slanted rolls, through a perforation press or a process or equipment comprised of perforating press and piercing mill.

After this perforation step, the elongation of the perforated billets takes place, which may be carried out through a Pilger-type mill or with Mandrels (Plug Mill) mill, or an MPM-type mill, or a PQF-type mill, or an Assel-type mill, or through an extrusion press. Alternatively, one can carry out the elongation of the perforated billet and transform it in a hollow bloom using a forge, or any other suitable type of equipment available on the market.

After elongation, depending on the design of the industrial facilities, a step of reheating the hollows at temperatures between 880 and 980° C. may be necessary prior to the step of finishing the hollows, transforming them into seamless tubes.

This hollow finishing step may be carried out by using equipment of the finishing mill type, for example a hot calibrating mill of the Sizing Mill type, a hot reducing roller of the Reducing Mill type, or a stretching-reducing mill, or a smoothing roller of the Reeler type mill, the latter in the case one has used a Mandrel-type mill to make the elongation of the perforated billets. After the elongation steps of hot rolling, the seamless tubes are subjected to an intermediate cooling, preferably at room temperature.

In a preferred embodiment of the invention, the billets are rolled via automatic rolling (Plug Mill), for tubes with an outer diameter of 168.3 and 365.1 mm (6 to 14 inches).

In a preferred embodiment of the invention, in automatic lamination the billet is reheated in a walking beam furnace at temperatures between 1100 and 1300° C., or still between 1000 and 1200° C. Then, the billet initiates a step of hot rolling, in which it is perforated on a slanted roll mill. After perforation, the perforated billet is then called a hollow bloom, which is transported to an elongation step through hot rolling, preferably by means of a mill with mandrels (Plug Mill), when a wall thickness that is quite close to the specified for the end product, by controlling the cylinder openings, guide openings and mandrel position.

Then the hollow resulting from this process goes through hot rolling once more, preferably carried out with a smoothing finishing mill (Reeler Mill), which performs the inner and outer smoothing of the seamless tube with expansion of the outer diameter.

The hollow is led to an intermediate cooling, reheated and subjected to a final rolling on a finishing mill.

At the end of the process of producing the seamless tubes, they are led to cooling beds and can follow different ways, according to the state of the raw material required for forging: rolled, normalized or quenched and tempered, or still a combination thereof.

The seamless tubes, when they are still in the rolled state to be forged later, preferably follow to hot straightening on a rotary straightening machine with three pairs of rollers and then follow to a cooling bed. The subsequent forging may be carried out cold, warm or hot.

The seamless tubes that follow the normalizing course remain in the bed for cooling until complete transformation thereof before being reheated, preferably in a walking beam furnace up to a temperature ranging from 880 to 950° C. for at least 10 minutes of soaking time. Then, the tube pieces of the axle are subjected to an air cooling.

The seamless tubes that follow the quenching course are reheated up to a temperature ranging from 880 to 950° C. for at lest 10 minutes of soaking time. Then the tube pieces of the axle are subjected to a water or oil cooling.

The previously rolled seamless tubes, or normalized or quenched tubes that follow the quenching course are subjected to a fast cooling, preferably made with water or oil.

The seamless tubes that follow the tempering course are heated in a reheating furnace, where they are kept at temperatures between 400 and 700° C. for at least 10 minutes of soaking time, and then they are subjected to air cooling.

Following the heat treatments and prior to forging, the tubes are hot-straightened, for example, on a rotary straightening machine.

After cooling and straightening, the hollows or seamless tubes are sent to non-destructive inspection testing as for dimensions and discontinuities. Each piece is measured and results are recorded with respect to wall thickness, outer diameter and length. Outer and inner, longitudinal, transverse and possibly oblique discontinuities are also analyzed. The pieces that exhibit deviations out of the tolerances are automatically marked for segregation of the segments with indication of deviation. Non-destructive inspection tests may be made by means of ultrasound with fixed-angle sonic beam, or still by means of ultrasound with a varying-angle sonic beam, or by means of Eddy-currents, or still by means of magnetic particles.

In the next step of visual and dimensional inspection, the pieces that exhibit discontinuities or deviations out of tolerance limits are marked for segregation of the segments with the respective deviations. Then, the pieces are sawn for obtaining submultiples and removal of the segments previously marked for segregation. A tracing system supervises and records the various operation parameters necessary to guarantee the product quality throughout the course between reheating the billet and its final cut into submultiples.

Depending on the design specifications of the axle to meet determined applications, in order to remove possible geometric imperfections generated in the process of manufacturing the seamless tube and to improve the inner rugosity, it may also be necessary to carry out finishing on the hollows prior to forging. This finishing is preferably made by machining on a part or over the whole inner surface of the tube, and/or grinding of the inner surface of the tube, and/or burnishing the inner surface of the tube with appropriate equipment, prior to the reduction of the ends by forging. One may carry out these steps in isolation or by any combination of these finishing steps, or still all of these steps successively on the same tube.

The seamless tubes or hollows produced in hot-rolling, heat-treated or not, with inner finish or not, are then led to forging. In a preferred embodiment of the invention, illustrated in FIG. 7, the forging step is hot-made and may be carried out in temperatures in the range of 800° C. to 1300° C. by means of two or more open matrices 14, which oscillate radially and have varying course, an auxiliary axial-upsetting tool 15 and a handler (not shown) for translation and rotation of the seamless tube, which may be commanded by computer-aided numeric control. In this way one obtains the blank forged tube 17 as shown in FIG. 10, with the two ends forged, or as shown in FIG. 9 with only one end forged.

Figure 8:
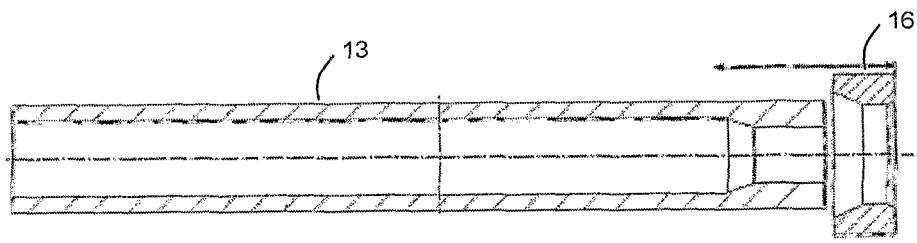
FIG. 8 shows a cross-section front view of the seamless tube, after an upsetting operation, with a matrix that compresses one of the ends of the tube axially and radially, reducing its diameter.
Figure 9:
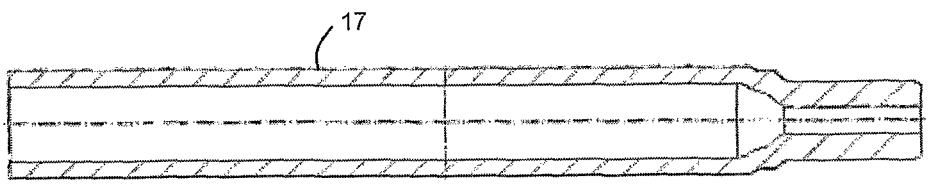
FIG. 9 shows a cross-section front view of a seamless tube after a forging operation at one end, either by oscillating open matrix or by half-open axial and radial compression matrix.
Figure 10:
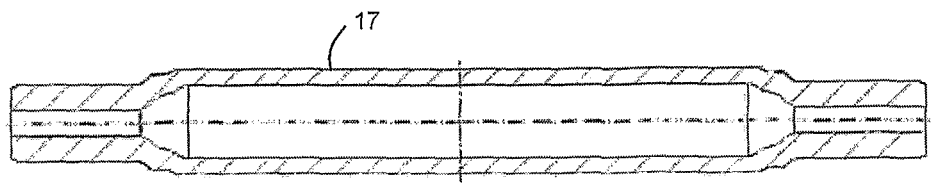
FIG. 10 shows a cross-section front view of a seamless tube after forging operations at the two ends, either by oscillating open matrix or by half-open axial and radial compression matrix.

Alternatively, and according to FIG. 8, forging is carried out by one or more half-open matrices 16, which compress axially and radially at least one of the tube ends, reducing the diameter thereof and transforming it into a blank forged axle, as shown in FIGS. 9 and 10. During this step, the axle preferably remains suspended by a support, as for instance, a claw. This support does not act on shaping the tubular axle and only serves to hold it while the matrices compress the ends thereof, to impart the desired shape to the tubular axle. This forging mode may be carried out cold, warm or hot, as deemed more appropriate. The cold-forging or warm forging is carried out in a temperature range between room temperature and 800° C. and the hot-forging is carried out in temperatures between 800° C. and 1300° C.

Figure 7:
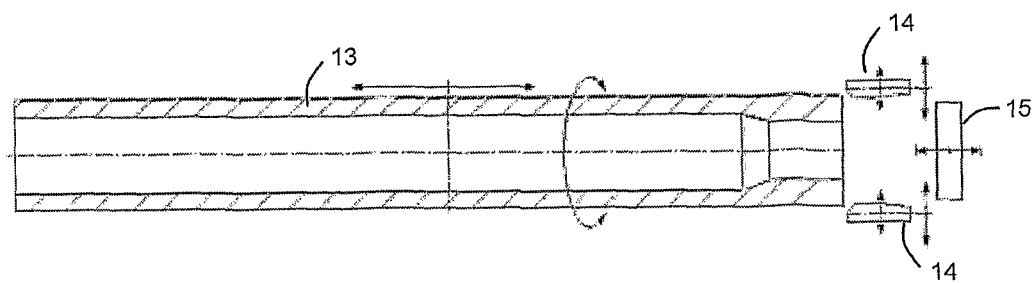
FIG. 7 shows a cross-section view of a seamless tube, after an upsetting operation, subjected to translation and rotation, with two open matrices that oscillate radially and have a varying course and an auxiliary axial-upsetting tool.

The forging process may be carried out with another type of equipment, without the means described before, but the surface finish and the dimension tolerances may not be adequate to the product. In the cases where hot-forging is made, heating of the end of the tube piece or hollow to be forged is preferably made through an electric induction furnace, but it may be made in a combustion furnace. When the desired temperature is achieved, the hollow is positioned on a handler, which carries out the advance and rotation operations therewith, while the open forging matrices 14, also called hammers, oscillate radially at a high frequency, with varying course, as shown in FIG. 7. The combination of these movements enable the formation of the hollow end according to the dimensional profile specified in design, as shown in FIG. 9. The process is repeated for the opposed end of each hollow, thus defining a blank forged axle from a seamless tube, as shown in FIG. 10.

Figure 5:
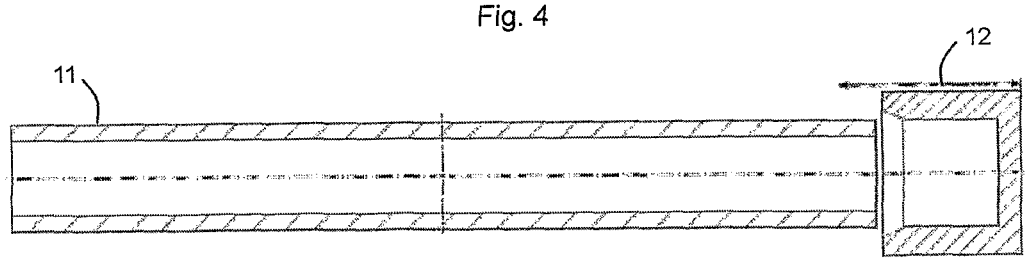
FIG. 5 is a cross-section front view of the seamless tube and of an upsetting tool that moves axially.
Figure 6:
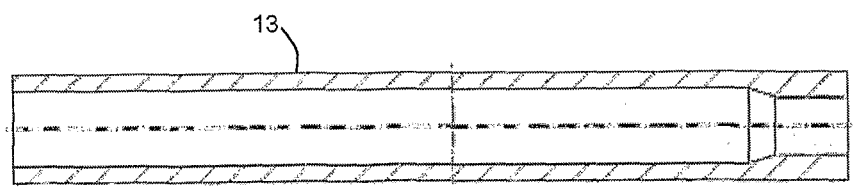
FIG. 6 is a cross-section front view of a seamless tube after an upsetting operation, where the thickness of the end has been increased.

Depending on the design specifications of the axle to meet determined applications, a localized thickness increase may be necessary, besides that resulting from the above-cited forging operation. In this case, prior to forging, one carries out an upsetting operation, which consists of localized heating of the seamless tube 11 in a temperature range between 800° C. and 1300° C. with an induction furnace in the region where one desires to increase the thickness, followed by application of a compressive longitudinal force through the advance of the upsetting tool 12 onto the seamless tube 11, as shown in FIG. 5. After this step, one obtains the upsetted tube 13, as shown in FIG. 6.

If forging of the tubular axle is hot-made, then after forging, the axles are still subjected to a cooling step, which may be carried out with air, forced air, water or oil.

The axle beams may follow different ways, according to the delivery state required for beneficiation, for instance, forged or heat-treated, for adjustment of the microstructure and of the mechanical properties according to the specifications. The heat-treatment may be integral, that is to say, over the whole beam, or partial, located in a specific region alone, for instance, the forged ends. In the latter case, the axle body remains with the mechanical properties and microstructure of the hollows.

The beams that will be beneficiated in the forged state follow directly to the machining operation. The beams that will undergo heat-treatment are led to the respective furnaces:

treatment in localized regions (induction furnaces or furnaces especially designed for this purpose) and treatment over the whole piece (induction furnaces, continuous or batch furnaces).

The treatment operations in both cases (partial or integral) are the same.

In the normalizing heat treatment over the whole axle or a part of if, the reaustenitization is made at a temperature between 880° C. and 950° C. either over the whole the tubular axle or only a part of it. The time inside the furnace depends on the wall thickness and is defined so as to guarantee that the whole cross section will exceed the austenitization temperature. Preferably, the soaking time at the specified temperature range is at least 10 minutes. Cooling is made with air immediately after the heating zone.

Tempering is made over the whole tubular axle or only on a part of it, in a temperature range between 400° C. and 700° C. The furnace residence time depends on the wall thickness and is defined so as to guarantee that the whole cross section will reach the tempering temperature. Preferably, the soaking time at the specified temperature range is at least 10 minutes. The cooling is made with air immediately after the heating zone.

The beams that undergo normalizing and tempering treatment in a localized region or over their whole length, are subjected to the two treatments mentioned above, in this sequence, whereas those that undergo either normalizing or tempering receive only one of the respective treatments.

The beams that undergo quenching over the whole tubular axle, or only over a part thereof, after the forging, are initially subjected to a reaustenitizing heat treatment at a temperature ranging from 880° C. to 950° C., for a period of soaking time of at least 10 minutes. After reaustenitizing, the axle region subjected to the heat treatment (either partial or integral) is descaled and quenched with water or oil (quenching fluid).

After quenching, the tubular axle may also be tempered according to the required strength level, by a tempering step, as described before, a soaking time longer than or equal to 10 minutes. Tempering may also be carried out after normalization.

In alternative embodiments of the invention, in order to beneficiate the tubular axle, it may be subjected to a any combination of the normalizing, quenching and tempering steps.

The microstructure for the chemical composition developed and for the typical cooling velocities, except when quenched, is predominantly constituted by bainite, in addition to ferrite, pearlite and possibly a minor fraction of martensite.

For the quenched and tempered material, the foreseen microstructure is predominantly composed of tempered matensite and may contain minor amounts of bainite, ferrite and pearlite, depending of the wall thickness.

After being heat-treated, the beams are subjected to the finishing operations.

Depending on the design specifications of the axle to meet determined applications, and alternatively on the different inner machined finishes applicable prior to forging, one may carry out a shot-peening onto the inner surfaces 9 and 10 of the axle shown in FIG. 3, after forging. Besides the removal of the oxide layer formed in the possible heat treatments, shot-peening forms a thin surface layer of a cold-hardened material subject to residual compression stresses. This layer inhibits nucleation and propagation of surface defects such as cracks, contributing to the fatigue strength of the axle.

As finishing steps, one may also carry out the straightening of the tubular axle, the inner machining of inspection bores at the ends of the tubular axle, the machining of a chamfer 7 at the border of the inner diameter of the inspection bores of the tubular axle, and the machining of at least two threaded and smoothly recessed bores 6, at each end. According to the present invention, one may carry out all these finishing steps, or still a successive combination of any of these steps, depending on the shape of the axle and on the characteristics of the inner surface of the axle which one desires to manufacture.

Straightening is made on manual or automatic equipment in order to prevent problems of lack of material in machining, eccentricity between the outer and inner diameters and the consequent unbalancing.

Material is removed by machining the whole outer surface in order to obtain the dimensions specified in design.

On the inner surface of the forged ends, one removes material by machining, according to the dimensions specified in design. This region may accommodate a cover and permits the coupling of ultrasound heads for inspection of the axle journal 1 beneath the bearing seat and the transition radius to the section of the dust guard 2 in FIG. 1. The inspection by the inner surface provides direct incidence (without reflection) and a short path of the sonic beam, mainly in the axle journal region, often subject to damages related to the bearing the its fittings. This facilitates the detection of discontinuities at initial stages, which would not be detected with usual methods.

In addition to these regions, other parts of the axle can be inspected from the inner surface, like the wheel seat and axle body; by simply removing the cover and introducing a probe with a reduced inspection head and appropriate coupling means (water, gel, laser, etc.).

Usually three threaded bores 5, circumferentially equidistant at each end, are required for fixation of the screws of the bearing covers, the position and the diameter of these bores being standardized.

In order to enable fixation and centralization of the axle between tips on a lathe, a chamfer 7 has been created at the edge of the inner diameter of the end, the total angle of which 10 is the same as that of the lathe support. However, it is necessary that the diameter of the counter-tip be compatible with the inner diameter of the end of the tubular axle, since this diameter is larger than that normally established in standards for the equivalent massive axle, as in the American Association of Railroads (AAR) standards.

As in some cases the inner diameter of the axle end bore is not sufficient to prevent interference of the chamfer 7 with the threaded bores 5, an optional smooth recess 6 has been introduced in the beginning of each threaded bore 5. This guarantees the application of the existing standardized covers and ensures the interchangeability of these axles.

The finish specified in some surfaces is met in the raw or machined states, but there are regions that need to be ground, such as the transitions radius of the axle journal and of the dust guard, to attenuate the stress concentration, reduce the size and the frequency of discontinuities and to improve the fatigue strength.

These and other regions of the axle may be subjected to techniques that introduce compressive residual stresses such as the rouletting or shot-peening effect, since these stresses contribute to increase the fatigue strength.

After the steps of finishing the axle, the process according to the invention may further comprise, when necessary, a heat-treatment step, which may be carried out before a final inspection of the product. The heat treatment preferably comprises quenching and tempering of at least a part of the tubular axle, that is to say, it may be carried out, for instance, only at the machined ends of the axle or still over the whole axle.

The axle journal and/or wheel seat may be quenched locally with the aid of an induction furnace for heating and sprayed with water for fast cooling. This technique (already used in road axle journal) increases significantly the hardness and strength of a surface area by changing the microstructure of the steel, which becomes predominantly martensitic. These properties raise the fatigue strength and fretting strength, phenomena present in these regions and generally associated with failures of railroad axles. Due to quenching, it is necessary that the quenched region be tempered.

The final inspection by non-destructive testing for discontinuities may be made by means of ultrasound with a fixed-angle sonic beam, or still by means of ultrasound with a varying-angle sonic beam, or by means of Eddy-currents, or still by means of magnetic particles.

The process described herein is capable of minimizing the waste of raw material, further reducing the manufacture costs of the tubular axle of the present invention.

The process according to the present invention is capable of producing railroad axles with a weight of approximately 40% less with respect to the solid axles. At the same time, by virtue of the advantages brought by the specific composition of the metal alloy used for manufacturing this axle, which are further potentiated by the particularities of the process of manufacturing these axles, the present invention provides a tubular axle with greater strength and fatigue strength, which presents a low weight and, as a result, optimized energetic efficiency.

The use of tools for inspecting the quality of the axle and detecting surface irregularities of the axle enables a much more precise control over the quality of the pieces produced, enabling one to reduce considerably the margin of error and of production of defective tubes, and to correct and eliminate determined defects formed on some axles along this manufacturing process. This effect is also achieved by means of statistic computer-aided control over some steps of the process, which also imparts greater precision to the process, reducing the number of defects on the tubes and the variability of the mechanical and microstructural variability of the product.

In view of the different alternative steps of the process according to the present invention, for instance, before forging, or in the steps of finishing the axle, it is possible to produce, by means of the process according to the present invention, axles with different physical properties, which can be more suitable for different conditions of application in railroad transportation. Combining the advantages provided by the material used in the formation of the tubular axles with the advantages provided by the manufacturing process, the present invention is capable of achieving all the desired objectives, producing low-cost axles, which, however, have better strength and fatigue strength, and with low waste of material.

The invention claimed is:

1. A process for manufacturing an axle having varying thickness and forged from seamless steel tube for railroad vehicles, wherein the process comprises the following steps:
   (1) melting a metal alloy material, generating the metallic steel alloy material, the generated metallic steel alloy material comprising 0.32 to 0.42% by weight of carbon and 1.10 to 1.70% by weight of manganese;
   (2) casting the molten material, forming ingoted products;
   (3) reheating for perforation of the ingoted products in a reheating furnace;
   (4) after the reheating step, perforating the ingoted products;
   (5) elongating the perforated products, forming hollow blooms;
   (6) finishing the hollows, transforming them into seamless tubes; and
   (7) after steps (1)-(6), forging the seamless tubes, transforming them into axles having varying thickness for railroad vehicles and properties of a minimum yield strength of 520 MPa, a minimum tensile strength of 750 MPa, and a minimum elongation of 16%.

2. The process according to claim 1, wherein the process comprises, after the melting step, a secondary-refinement step in a pot furnace, in which adjustments are made in the chemical composition of the metal alloy and metallurgical treatment with calcium-silicon is carried out.

3. The process according to claim 2, wherein the process comprises, after the secondary-refinement step, a vacuum degasification step.

4. The process according to claim 1, wherein the casting step is carried out under electromagnetic stirring.

5. The process according to claim 1, wherein, after the casting step, the ingoted product is subjected to an auxiliary reheating step at a temperature of from 880° C. to 1300° C. for a time between 1 and 48 hours.

6. The process according to claim 5, wherein the process comprises, after the auxiliary reheating step, a rolling step.

7. The process according to claim 1, wherein the reheating step for perforation of the ingoted products is carried out in a reheating furnace at temperatures between 1000° C. and 1300° C.

8. The process according to claim 1, wherein a step of reheating the hollow between 820° C. and 980° C. is carried out before the step of finishing the hollows.

9. The process according to claim 1, wherein, after the finishing step, the seamless tubes are subjected to a cooling bed.

10. The process according to claim 1, wherein, prior to the forging step, the seamless tubes are normalized, wherein the seamless tubes are kept at temperatures between 880° C. and 950° C. for at least 10 minutes of soaking time, after which the seamless tubes are subjected to air cooling.

11. The process according to claim 1, wherein, prior to the forging step, the seamless tubes are quenched, wherein the seamless tubes are kept at temperatures between 880° C. and 950° C. for at least 10 minutes of soaking time, and then a fast cooling of the axle tubes is carried out by a medium selected from water and oil.

12. The process according to claim 9, wherein the seamless tubes are tempered in a reheating furnace, wherein the seamless tubes are kept at temperatures between 400° C. and 700° C. for at least 10 minutes of soaking time, after which the seamless tubes are subjected to air cooling.

13. The process according to claim 1, wherein, prior to the forging step, the seamless tubes are hot-straightened and follow to a cooling bed.

14. The process according to claim 1, wherein the process comprises, prior to the forging step, a step of inspecting the tubes by non-destructive testing for dimensions and surface discontinuities.

15. The process according to claim 14, wherein the process comprises, after the inspection step, a finishing step that comprises machining the whole inner surface of the seamless tubes.

16. The process according to claim 15, wherein, after the machining, a grinding of the inner surface of the seamless tubes is performed.

17. The process according to claim 15, wherein, after the machining, the burnishing of the inner surface of the seamless tubes is performed.

18. The process according to claim 1, wherein, prior to the forging step, an upsetting step is performed, in which the seamless tubes are heated to between 800° C. and 1300° C. in the region where the thickness will be increased, and then a compressive longitudinal force is applied in the axial direction of the seamless tubes by advancing an upsetting tool.

19. The process according to claim 1, wherein the forging step is carried out in temperatures in the range of 800° C. to 1300° C. by means of at least two open matrices that oscillate radially and have varying course, an auxiliary axial-upsetting tool and a handler for translation and rotation of the seamless tube, which can be commanded by computer-aided numerical control.

20. The process according to claim 1, wherein the forging step is carried out in a temperature range from room temperature to 1300° C. by means of a matrix that compresses axially and radially at least one of the ends of the tube, reducing its diameter and transforming it into a forged axle.

21. The process according to claim 1, wherein, when the forging is hot-made, the process further comprises a cooling step after the forging, in which the cooling is carried out in a medium selected from the following media: air, forced air, water and oil.

22. The process according to claim 1, wherein the process comprises a step of normalizing at least a part of the seamless tube, using a furnace for heating up to temperatures between 880° C. and 950° C. for at least 10 minutes of soaking time and cooling in air.

23. The process according to claim 1, wherein the process comprises a step of quenching at least a part of the seamless tube, by using, for austenitization, a furnace for heating up to temperatures between 880° C. and 950° C. for at least 10 minutes of soaking time and, for quenching, a fast cooling in water.

24. The process according to claim 1, wherein the process comprises a step of tempering at least a part of the seamless tube, by using a furnace for reheating up to temperatures between 400° C. and 700° C., for at least 10 minutes of soaking time and cooling in air.

25. The process according to claim 1, wherein the finishing step comprises at least one of the following steps: shot-peening the inner surface of the tube, straightening the tube, internally machining inspection bores at the two ends of the tube, machining a chamfer at the edge of the inner diameter of the inspection bores of the tube, and machining at least two threaded and smoothly recessed bores at each end.

26. The process according to claim 1, wherein the process comprises, after the finishing step, a heat-treatment step of quenching and tempering, applied to at least a part of the forged axle.

27. The process according to claim 1, wherein the process comprises, after the finishing step, a non-destructive inspection step for detecting surface defects on the forged axle.

* * * * *